Jan. 28, 1969  C. F. BOTHA  3,424,079
PELLETING MACHINE

Filed Nov. 29, 1965

Inventor
Charles Francois Botha
By
Karen W. Flocks
Attorney

United States Patent Office 3,424,079
Patented Jan. 28, 1969

3,424,079
PELLETING MACHINE
Charles Francois Botha, 38 Hill St., Malmesbury,
Republic of South Africa
Filed Nov. 29, 1965, Ser. No. 510,237
Claims priority, application Republic of South Africa,
Dec. 7, 1964, 64/5,833; Nov. 19, 1965, 65/6,246, July
14, 1965, 65/3,734
U.S. Cl. 100—186                           6 Claims
Int. Cl. B30b 1/00, 15/14, 15/16

ABSTRACT OF THE DISCLOSURE

The disclosed device involves a pelleting machine for use in the pelleting of cellulosic feed material for livestock. The pelleting machine comprises a plurality of plunger and die assemblies spaced circumferentially about plunger displacement means for displacing the plungers cyclically and reciprocatingly relative to the dies. Each die comprises a barrel of resilient material having an inlet port leading transversely into the die.

---

This invention relates to a pelleting machine, suitable for use in the pelleting of cellulosic feed materials for livestock. More particularly, the invention relates to a machine suitable for producing pellets of grass, hay, or other animal feeds.

According to the invention, a pelleting machine includes at least one plunger and die assembly, the die being at least partly of resilient material and having an open end remote from the plunger, the plunger being axially reciprocable in the bore of the die; and plunger displacing means for displacing the plunger cyclically and reciprocatingly relative to the die.

The resilient material may be a synthetic plastic material.

The die may comprise a barrel which is of resilient material; and a loading bay of wear-resistant material having a passage aligned or alignable with the bore of the barrel, and defining an inlet port leading transversely into the passage to permit the entry of material for pelleting. The barrel may be a moulding of resilient synthetic plastic material. The loading bay may be moulded integrally with the barrel. Alternatively, the barrel may be provided with a seat adapted to receive removably a loading bay in the form of a replaceable insert.

The loading bay may have a ring formation at one end of the passage, or at both ends, if preferred, the two rings being in coaxial spaced relationship, and being joined by an axially extending bridge-piece defining a portion of the passage. The first-mentioned ring formation defines the outlet out of the passage. The inner face of the said ring formation at the outlet end of the loading bay may be at an inclination to the axis of the passage. This face may define an acute angle with the axis of the bore, i.e., it may slope upwardly and rearwardly towards the other ring formation. The slope of this face may depend upon the type of fodder used for pelleting, the shape of the end of the plunger member, and upon the speed of operation.

The end of the plunger member may be convex, or may be concave to provide a peripheral cutting edge.

The barrel and the loading bay may be separable parts. The barrel may be counterbored to receive the front end of the loading bay. Alternatively, locating means may be provided to locate the passage of the loading bay in alignment with the bore of the barrel, the loading bay abutting end-on with the barrel.

The barrel may conveniently be arranged to seat in a holding member, and may have a collar or flange for locating it axially in the holding member. At the rear end of the loading bay, there may be provided sealing means around the passage for sealing off the rear end of the die from the loading bay, to ensure that lubricating material does not enter the passage of the loading bay, and there contaminate fodder which is being pelleted.

The sealing means may comprise an O-ring around the plunger and seated in a groove in a bush, which may be of brass or bronze, and maintained in coaxial alignment with the passage of the loading bay. If desired, the bush may be counterbored so that the rear end of the loading bay may be seated within the counterbore.

The invention also extends as a replaceable part, to a loading bay of wear-resistant material, and having a passage and a port leading transversely into the passage, and adapted to be held such that the passage is in coaxial alignment with the bore of the barrel. The loading bay may have coaxial ring formations at its front and rear ends in axially spaced relationship, and held by a bridge-piece having an arcuate inner surface which is alignable with the bore of the barrel and which is adapted to form part of the bore of a die.

The invention extends also as a replaceable part, to a barrel adapted for alignment co-axially with a loading bay, as described.

There may be provided a plurality of plunger and die assemblies spaced circumferentially about the plunger displacement means. The axes of the plunger and die assemblies may be substantially horizontal and the inlet ports may be arranged to lead transversely into the dies, the ports being covered by plungers at the ends of their working strokes but uncovered at the ends of their return strokes.

A feed hopper may be provided into which material to be pelleted may be charged, the feed hopper being arranged to discharge downwardly into the inlet ports. The inlet ports may be disposed between a pair of radially spaced annular walls defining an annular channel, and there may be provided agitating means in the form of at least one feed arm circumferentially displaceable within the channel over the inlet ports.

There may be provided liquid material feed means comprising a central reservoir and a conduit leading from the reservoir and having an outlet opening over the channel. Conveniently the conduit is provided along or integral with the feed arm.

The plunger displacement means may include an eccentric sheave rotatable about an axis eccentric to its polar axis; a mating ring around the eccentric; and at least one link member connected to one or more plungers and pivotally connected to the mating ring; whereby rotation of the eccentric sheave causes reciprocation of the plungers.

There may further be provided a plurality of link members pivotally connected in circumferentially spaced relationship to shoes which are seated in recesses provided in the mating ring. The link members may be guided linearly for reciprocation by piston elements reciprocable in guide bores in a guide member provided coaxially with the rotational axis of the eccentric sheave.

A machine and parts, in accordance with the invention, will now be described by way of example with reference to the accompanying drawings.

The machine will first be described generally and its method of operation. Thereupon particular constructions of dies will be described.

Figure 1:
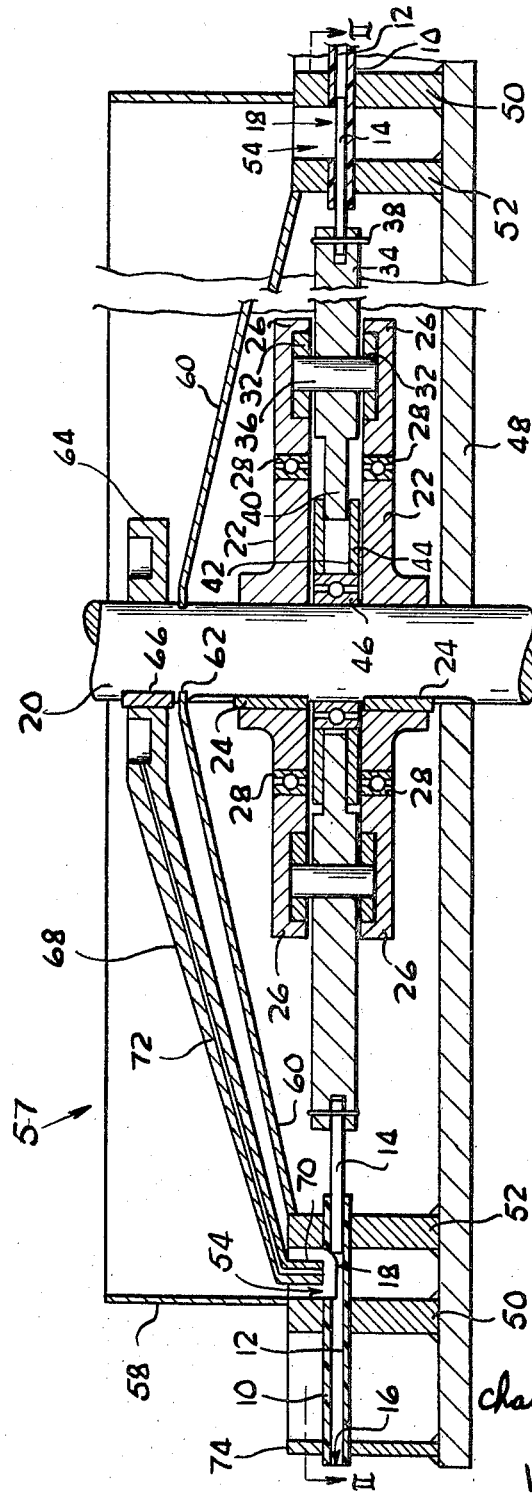
FIGURE 1 shows a sectional side view of a pelleting machine according to the invention.
Figure 2:
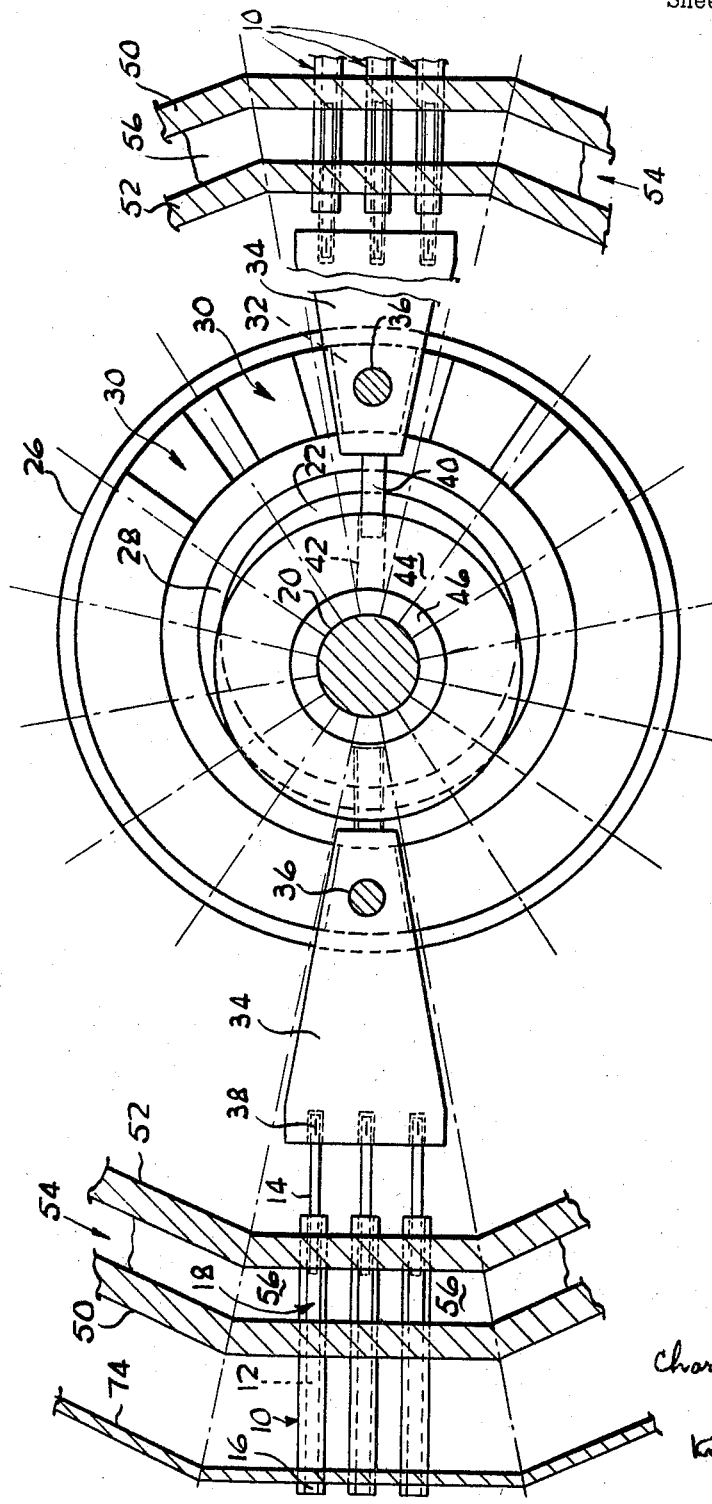
FIGURE 2 shows a section taken on line II—II of FIGURE 1.

Referring to FIGURES 1 and 2 of the drawings, reference numeral 10 shows a tubular die of resilient material, such as synthetic plastic material, having a bore 12 in part of which a plunger 14 is axially reciprocable. The die 10 has an opening 16 remote from the plunger, and an inlet port 18 leading sidewardly into the bore of the die.

Displacement means are provided for displacing the plunger 14 cyclically and reciprocatingly relative to the die, and the displacement means includes a drive shaft 20 which is mounted for rotation about a substantially vertical axis. To the drive shaft 20 there are secured a pair of axially spaced eccentric sheaves 22 by means of keys 24 which ensure that the eccentrics 22 rotate together with the drive shaft 20. A mating ring 26 is provided around each eccentric 22 on a ball race 28 in such a way that the eccentric 22 and the mating ring 26 can rotate relatively to one another.

In the mating ring 26 there are provided a plurality of circumferentially spaced recesses 30 in which shoes 32 are seated. A link member 34 is pivotally connected to each shoe 32 by means of a pin 36. Each link member 34 is connected to a group of plungers 14 by means of a pin 38, and it will therefore be understood that a plurality of plunger and die assemblies 14, 10 are circumferentially spaced about the drive shaft 20 in a substantially horizontally disposed plane.

Each link member 34 has a radially projecting piston element 40 which is reciprocable in a radially directed guide bore 42 which is provided in a circular disc 44. The disc 44 is mounted on a ball race 46 which is mounted on the drive shaft 20, whereby the disc 44 is capable of relative rotational movement to the drive shaft 20. The guide bore 42 in which the piston element 40 is reciprocable guides the link member 34 linearly during rotation of the drive shaft 20 about its axis.

A base plate 48 is provided through which the drive shaft 20 projects and relative to which the drive shaft 20 is capable of rotating. On the base plate 48 there are mounted radially spaced annular walls 50, 52, defining between them an annular channel 54 leading into the inlet ports 18. If desired, an annular plate 56 (see FIGURE 2) may be provided in the channel 54 to extend horizontally between the dies 10 at a level just lower than the inlet ports 18, to define a floor to the channel 54.

A feed hopper 57 is provided into which material to be pelleted may be charged. The feed hopper 57 may have a cylindrical side wall 58 and a sloping floor 60, the arrangement of the side wall and floor being such that the feed hopper feeds the material into the annular channel 54. A seal 62 is provided between the sloping floor 60 and the drive shaft 20 to permit rotation of the drive shaft 20 relative to the floor.

A liquid storage reservoir 64 is provided at the upper region of the machine and is secured to the drive shaft 20 by means of a key 66, whereby the storage reservoir 20 rotates together with the drive shaft 20. A circumferentially displaceable feed arm 68 is secured to the liquid storage reservoir 64, and has a bent-over portion 70 which is adapted to cooperate with the annular channel 54 and to feed material from the hopper into the inlet ports 18. From the liquid storage reservoir 64 a flow passage 72 is provided in the feed arms 68 for discharging liquid into the annular channel 54, whereby liquid may be added to the material which is to be compressed into pellets.

A further annular wall 74 is provided in radially spaced relationship outside the annular wall 50 for supporting the end part of the die 10, in which the opening 16 is provided.

Figure 3:
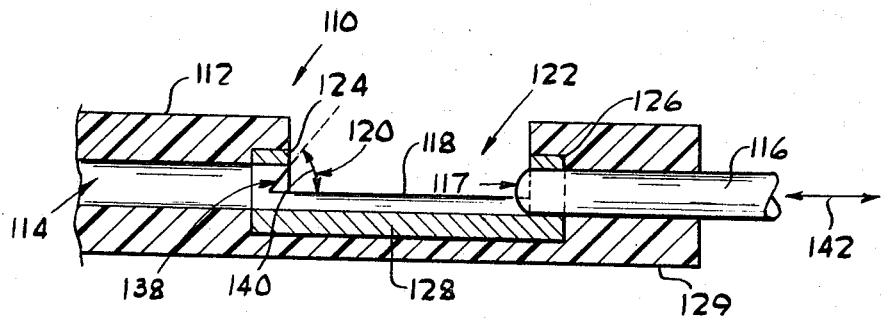
FIGURE 3 shows a part-sectional side elevation of one arrangement of a plunger and die assembly.

Referring now to FIGURE 3 of the drawings, reference numeral 110 refers generally to a die having a barrel part 112 within part of whose bore 114 a plunger 116 is reciprocable. The plunger 116 has a convex end 117. The die comprises the barrel part 112 and a loading bay part 118 having a passage 120 aligned with the bore 114. The barrel part is of a resilient material and is a moulding of synthetic plastic material such as nylon. The loading bay part is of wear-resistant material such as tool steel. It is moulded integrally with the barrel part.

The loading bay part has a port 122 leading transversely into the passage 120. This port 122 is defined between a front ring formation 124 and rear ring formation 126 spaced axially from the front ring formation 124. The ring formations 124 and 126 are joined by a bridge-piece 128. The rear ring formation 126 seats in a tail part 129 integral with the barrel.

Figure 4:
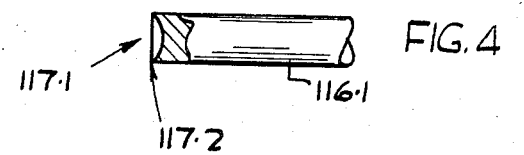
FIGURE 4 shows a part side elevation of the end of a plunger.

FIGURE 4 shows a fragmentary view in side elevation of another plunger 116.1 having a concave end 117.1, thereby defining a cutting edge 117.2 around its periphery.

Figure 5:
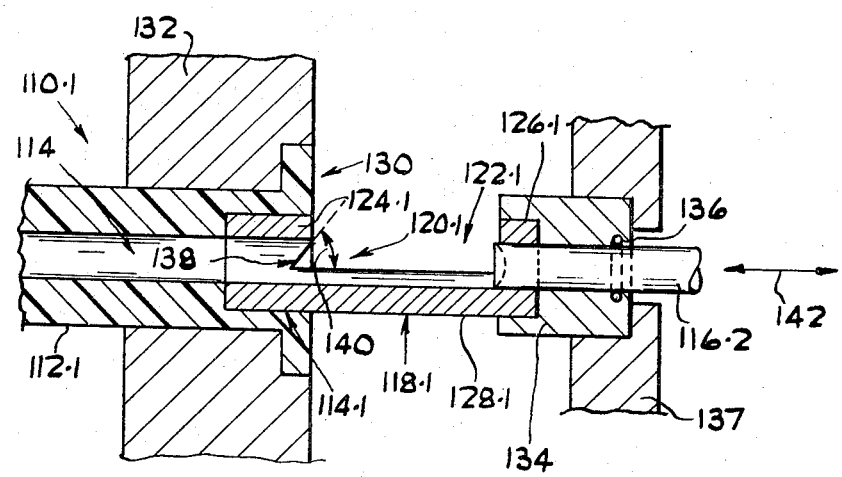
FIGURE 5 shows a part-sectional side elevation of another arrangement of a plunger and die assembly.

FIGURE 5 shows another embodiment of die generally indicated by reference numeral 110.1 This die comprises a brarel part 112.1 of moulded nylon or the like, and having a bore 114 and a flanged end 130 and arranged to seat in a seat provided in a holding member 132, which may be the outer annular wall 50 or which may be arranged to seat in such wall. (See FIGURES 1 and 2.) The die comprises further a loading bay part 118.1 of tool steel and having a passage 120.1 and a transverse port 122.1 leading into the passage. The port 122.1 is defined between the axially spaced front ring formation 124.1 and rear ring formation 126.1 which are joined by the bridge-piece 128.1.

The front end of the loading bay part is receivable into a counterbore 114.1 in the tail end of the barrel part 112.1. The die also comprises a bush 134 around the tail end of the loading bay part 118.1 seating in the bush coaxially with it. The bush 134 has an O-ring 136 around the plunger 116.2 to act as a seal against lubricant reaching the passage 120.1 of the loading bay part 118.1 The bush may be of brass or bronze and may be seated in a holding member 137 which may be the inner annular wall 52 or which may be arranged to seat in such wall. (See FIGURES 1 and 2.)

The degree of rake of the face 138 may be varied to suit individual preferences. The angle 140 may be obtuse, a ringt angle, or acute as shown in the drawings. This angle 140 may be varied to suit the material to be pelleted.

In use, the material which is to be pelleted is charged into the hopper 57. When the drive shaft 20 is set in motion the feed arm 68 is circumferentially displaced, whereby the material contained in the hopper is agitated and is fed into the annular channel 54 in which it is forced into the ports 18 by means of the bent-over end part 70. During rotation of the drive shaft 20, the eccentric sheaves 22 are rotated, and the mating rings 26 are eccentrically displaced about the drive shaft 20. The eccentric displacement of the mating rings 26 causes the link members 34 to be reciprocated, and the plungers 14 which are connected to the link members 34 are thereby axially reciprocated in the bores 12 of the dies 10.

The arrangement of the port 18 in the die 10 is such that the port is covered by the plunger 14 at the end of its working stroke, but is uncovered at the end of its return stroke. While the port 18 is uncovered, material is fed through it from the annular channel 54 into the bore 12 of the die 10, and during the working stroke of the plunger 14 the material is compressed in the die 10.

The compressed material is displaced from the bore 12 of the die 10 through the open end 16 in the form of a rod of compressed material. When this rod is broken into smaller particles at intervals, pellets are formed.

In using the dies shown in FIGURES 3 and 5 of the drawings, material enters the passage 120 or 120.1 via the ports 122 or 122.1. Reciprocation of the plungers 116, 116.1, or 116.2 in the direction of arrow 142 causes a charge of feed material in the passage 120 or 120.1 to be compressed in the resilient nylon barrel 112, or 112.1. The face 138 acts as a cutting face. As the die and plunger heat up due to friction in operation, so the barrel expands to prevent seizure of the plunger in the barrel.

The liquid which is added from the liquid storage reservoir 64 through the flow passage 72 to the material container in the annular channel 54, is controlled to ensure that the material has the desired consistency for pellets of a suitable density to be formed.

In the embodiment of the invetnion shown in FIG-URES 1 and 2 of the drawings, one revolution of the eccentric sheave 22 about its polar axis causes each link member 34 to be reciprocated once, i.e., each plunger 14 executes one working stroke and one return stroke during a revolution of the eccentric sheave 22 about its polar axis.

The material from which the die or barrel is made may be synthetic plastic material of the type presently commercially known as nylon, nylatrom G.S., nylon 6, nylon M.C., nylon fluorosint, nylon pentom, or nylon T.F.E. The plunger may be of bright steel, and the loading bar may be of a suitably hard or suitable hardenable steel.

One advantage of a pelleting machine according to the invention in which the die is of resilient material, is that during a working stroke of the plunger the die is capable of expanding whereby friction between the plunger and the die is kept low.

What I claim is:

1. A pelleting machine comprising at least one plunger and die assembly, the die comprising a moulded barrel of resilient material having a bore with an open end remote from the plunger, and being moulded around a loading bay of wear resistant material having a passage aligned with the bore of the barrel, and defining an inlet port leading transversely into the passage to permit the entry of material for pelleting, and the plunger being axially reciprocable in the die; and plunger displacement means for displacing the plunger cyclically and reciprocatingly relative to the die.

2. A pelleting machine comprising a plurality of plunger and die assemblies having substantially horizontal axes and being spaced circumferentially about plunger displacement means for displacing each plunger cyclically and reciprocatingly relative to its respective die; each die being at least partly of resilient material and having an open end remote from the plunger, and each plunger being axially reciprocable in the bore of its respective die; there being provided inlet ports leading transversely into the dies and being disposed between a pair of radially spaced annular walls defining an annular channel, the ports being covered by the plungers at the ends of their working strokes but uncovered at the ends ot their return strokes; and agitating means in the form of at least one feed arm circumferentially displaceable within the channel over the inlet ports.

3. A machine according to claim 2, in which there is provided liquid feed means comprising a central reservoir and a conduit leading from the reservoir and having an outlet opening over the channel.

4. A machine according to claim 3, in which the conduit is provided along the feed arm.

5. A pelleting machine comprising a plurality of plunger and die assemblies spaced circumferentially about plunger displacement means for displacing each plunger cyclically and reciprocatingly relatively to its respective die; each die having an open end remote from the plunger, and each plunger being axially reciprocable in the bore of its respective die; the plunger displacement means including an eccentric sheave rotatable about an axis eccentric to its polar axis, a mating ring around the eccentric, and a plurality of link members each connected to one or more of the plungers, and each pivotally connected in circumferentially space relationship to shoes which are seated in recesses provided in the mating ring; the link members being guided linearly for reciprocation by piston elements connected to the link members and being reciprocable in guide bores in a guide member provided coaxially with the rotational axis of the eccentric sheave.

6. A replaceable die for a pelleting machine having a plunger and die assembly including a replaceable die and a plunger axially reciprocable in said die, said replaceable die comprising:
a moulded barrel of resilient material having an axial bore and being moulded around a loading bay of wear resistant material having a passage aligned with the bore of said barrel, said loading bay having an inlet port leading transversely to said passage.

References Cited

UNITED STATES PATENTS

| 72,573 | 12/1867 | Weissenborn | 100—186X |
| 1,238,891 | 9/1917 | Barton | 100—95 |
| 2,279,632 | 4/1942 | Meakin | 107—8.3 |
| 2,403,476 | 7/1946 | Berry et al. | 100 |
| 2,425,237 | 8/1947 | Field | 100 |
| 2,507,491 | 5/1950 | Crea | 100 |
| 2,605,657 | 8/1952 | Lindemann et al. | 100—232X |
| 3,008,434 | 11/1961 | Maldari | 107—14 |
| 3,052,923 | 9/1962 | Sandor et al. | 100 |

FOREIGN PATENTS

| 875,544 | 7/1942 | France. |
| 528,239 | 6/1955 | Italy. |

LOUIS O. MAASSEL, *Primary Examiner.*

U.S. Cl. X.R.

100—190, 209